United States Patent
Sasaki (10) Patent No.: US 10,128,045 B2
(45) Date of Patent: Nov. 13, 2018

(54) FILM CAPACITOR

(71) Applicant: Panasonic Intellectual Property Management Co., Ltd., Osaka (JP)

(72) Inventor: Makoto Sasaki, Toyama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/318,016

(22) PCT Filed: Jun. 26, 2015

(86) PCT No.: PCT/JP2015/003214
§ 371 (c)(1),
(2) Date: Dec. 12, 2016

(87) PCT Pub. No.: WO2016/002177
PCT Pub. Date: Jan. 7, 2016

(65) Prior Publication Data
US 2017/0133154 A1    May 11, 2017

(30) Foreign Application Priority Data
Jul. 2, 2014    (JP) .................................. 2014-136523

(51) Int. Cl.
*H01G 4/228*    (2006.01)
*H01G 4/38*    (2006.01)

(52) U.S. Cl.
CPC .............. *H01G 4/228* (2013.01); *H01G 4/38* (2013.01)

(58) Field of Classification Search
CPC .................................. H01G 4/228; H01G 4/38
(Continued)

(56) References Cited

U.S. PATENT DOCUMENTS 9,225,035 B1 * 12/2015  Werre ............... H01M 10/0468
2006/0104006 A1    5/2006  Saito et al.
(Continued)

FOREIGN PATENT DOCUMENTS

CN    103680957 A    3/2014
JP    2001-326131    11/2001
(Continued)

OTHER PUBLICATIONS

International Search Report of PCT application No. PCT/JP2015/003214 dated Aug. 11, 2015.
(Continued)

*Primary Examiner* — Michael P McFadden
(74) *Attorney, Agent, or Firm* — McDermott Will & Emery LLP (57) ABSTRACT

A film capacitor includes: two adjacent capacitor elements, each of which has end-face electrodes at two end faces, respectively, and an insulating film at a lateral surface, each of the adjacent capacitor elements having dielectric films and metal layers that are alternately disposed; and a bus bar for connecting the end-face electrodes of the adjacent capacitor elements on one side. The lateral surfaces of the adjacent capacitor elements are disposed to be opposite to each other. The bus bar includes a tongue piece. The tongue piece is disposed between the lateral surfaces of the adjacent capacitor elements. With this arrangement, the film capacitor can dissipate heat generated during charging and discharging and thus have improved heat-dissipating performance.

4 Claims, 7 Drawing Sheets

(58) Field of Classification Search
USPC .......................................................... 361/328
See application file for complete search history.

(56) References Cited

U.S. PATENT DOCUMENTS

2008/0273289 A1    11/2008   Saito et al.
2014/0063688 A1*    3/2014   Sasaki .................... H01G 4/385
                                                        361/308.1
2014/0294045 A1*   10/2014   Hironaka ................ H01G 9/26
                                                        374/142

FOREIGN PATENT DOCUMENTS

| JP | 2006-147687 | 6/2006 |
| JP | 2013-146179 | 7/2013 |
| JP | 2014-203893 | 10/2014 |

OTHER PUBLICATIONS

English Translation of Chinese Search Report dated Sep. 3, 2018 for the related Chinese Patent Application No. 201580033268.8.

* cited by examiner

FILM CAPACITOR

This application is a U.S. national stage application of the PCT international application No. PCT/JP2015/003214 filed on Jun. 26, 2015, which claims the benefit of foreign priority of Japanese patent application No. 2014-136523 filed on Jul. 2, 2014, the contents all of which are incorporated herein by reference.

TECHNICAL FIELD

The present invention relates to a film capacitor having bus bars connected to capacitor elements.

BACKGROUND ART

In recent years, a film capacitor mounted in, for example, an electrical apparatus, an electronic device, industrial equipment, and an automobile is required to have increased reliability by dissipating heat generated during charging and discharging.

Figure 7:
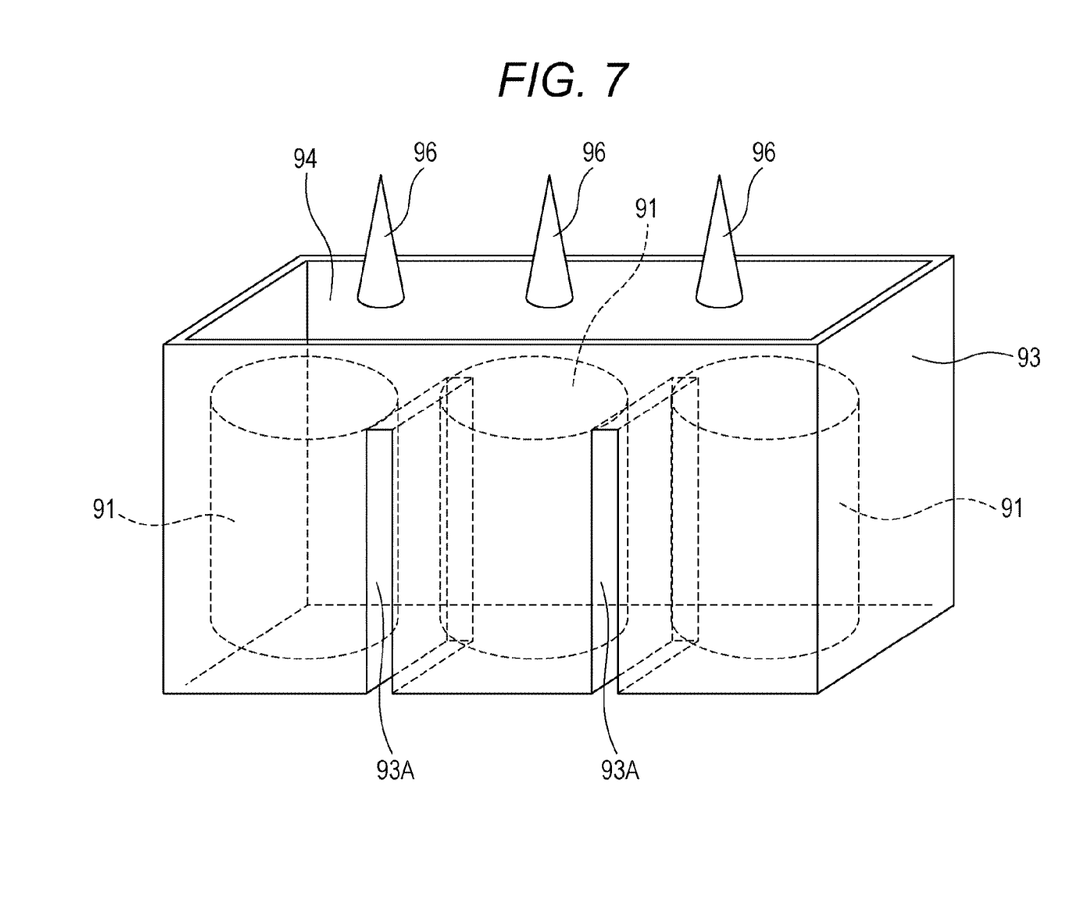
FIG. 7 is a perspective view of a conventional film capacitor.

FIG. 7 is a perspective view of a conventional film capacitor. As shown in FIG. 7, the conventional film capacitor includes a plurality of capacitor elements 91, case 93 for accommodating capacitor elements 91, and external lead terminals 96 electrically connected to respective capacitor elements 91. Case 93 is provided with slits 93A that open onto either of opposed wall surfaces of case 93 and separate capacitor elements 91. Insulating resin layer 94 is formed within case 93 to seal in capacitor elements 91. Because slits 93A are provided, an air layer can be provided between capacitor elements 91. Accordingly, the heat generated by capacitor elements 91 can be dissipated to the outside directly through slits 93A.

A film capacitor having such slits is disclosed, for example, in PTL 1.

According to the technique disclosed in PTL 1, the heat generated by capacitor elements 91 can be dissipated to the outside without fail. However, the film capacitor is required to have further improvement in heat-dissipating performance.

CITATION LIST

Patent Literature

PTL 1: Unexamined Japanese Patent Publication No. 2001-326131

SUMMARY

A film capacitor of the present invention includes: two adjacent capacitor elements, each of which has end-face electrodes at two end faces, respectively, and an insulating film at a lateral surface, each of the adjacent capacitor elements having dielectric films and metal layers that are alternately disposed; and a bus bar for connecting the end-face electrodes of the adjacent capacitor elements on one side. The lateral surfaces of the adjacent capacitor elements are disposed to be opposite to each other. The bus bar includes a tongue piece. The tongue piece is disposed between the lateral surfaces of the adjacent capacitor elements. The heat-dissipating performance is improved by this structure, so that the film capacitor can have increased reliability.

DESCRIPTION OF PREFERRED EMBODIMENTS

Hereinafter, a description will be given of an arrangement of a film capacitor according to an exemplary embodiment of the present invention, and a method for manufacturing the same with reference to the accompanying drawings.

Figure 1:
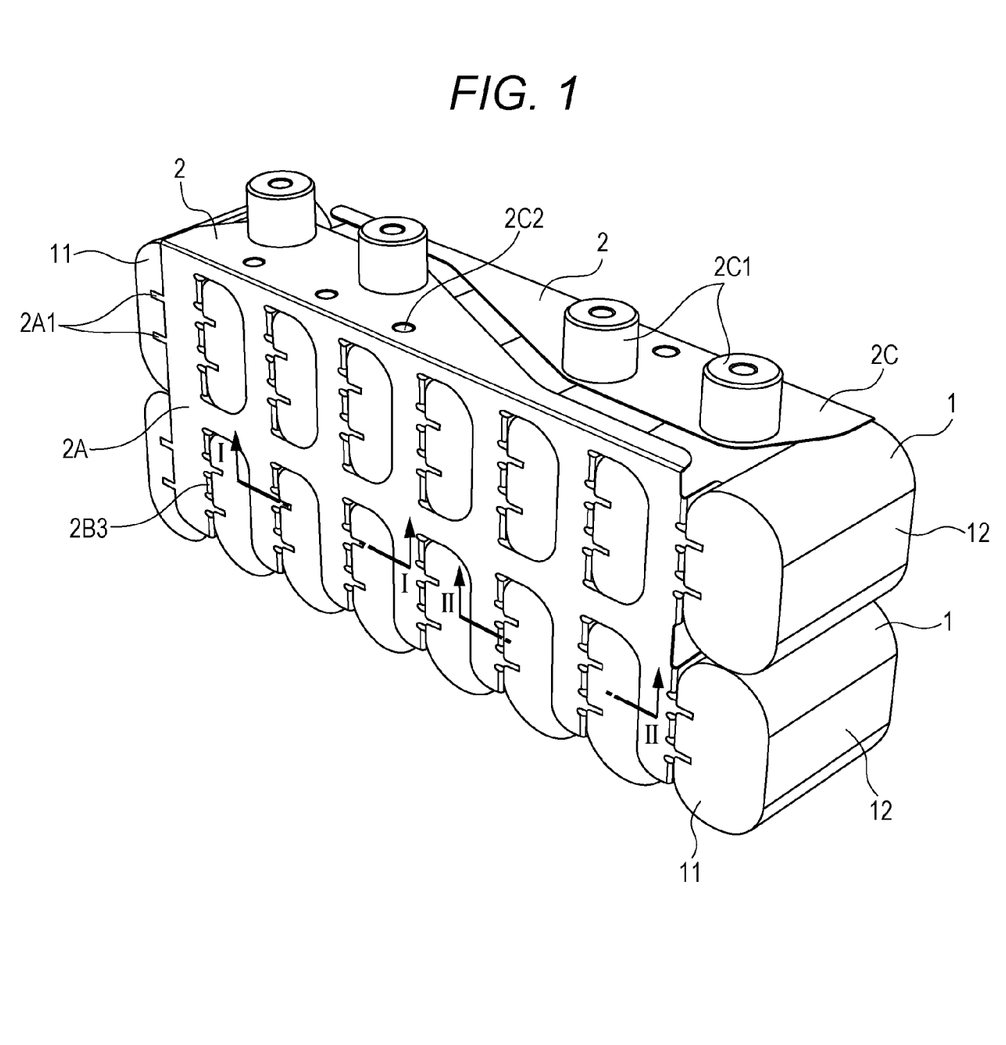
FIG. 1 is a perspective view of a main part of a film capacitor according to an exemplary embodiment of the present invention.
Figure 2:
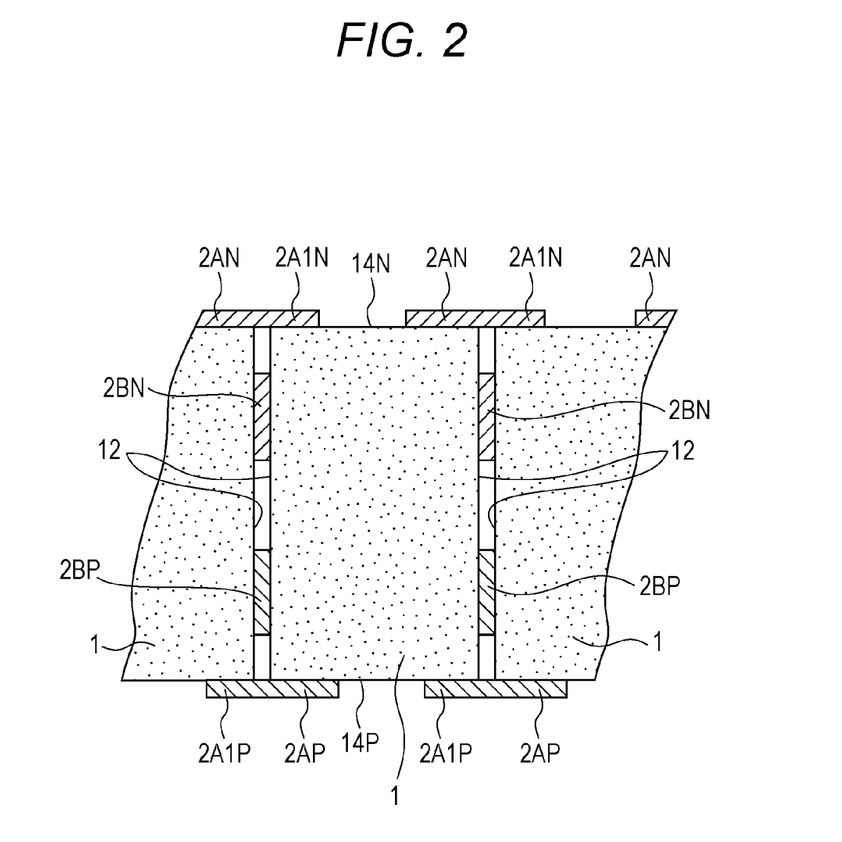
FIG. 2 is a sectional view of a main portion of the film capacitor according to the exemplary embodiment of the present invention.
Figure 3:
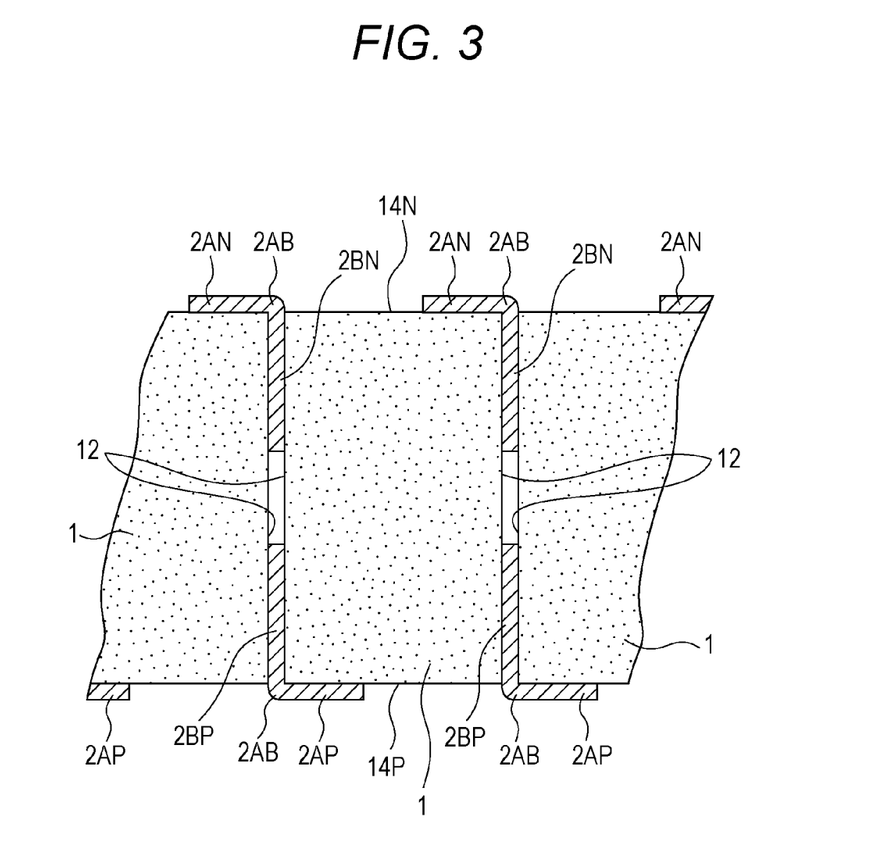
FIG. 3 is another sectional view of the essential portion of the film capacitor according to the exemplary embodiment of the present invention.
Figure 4:
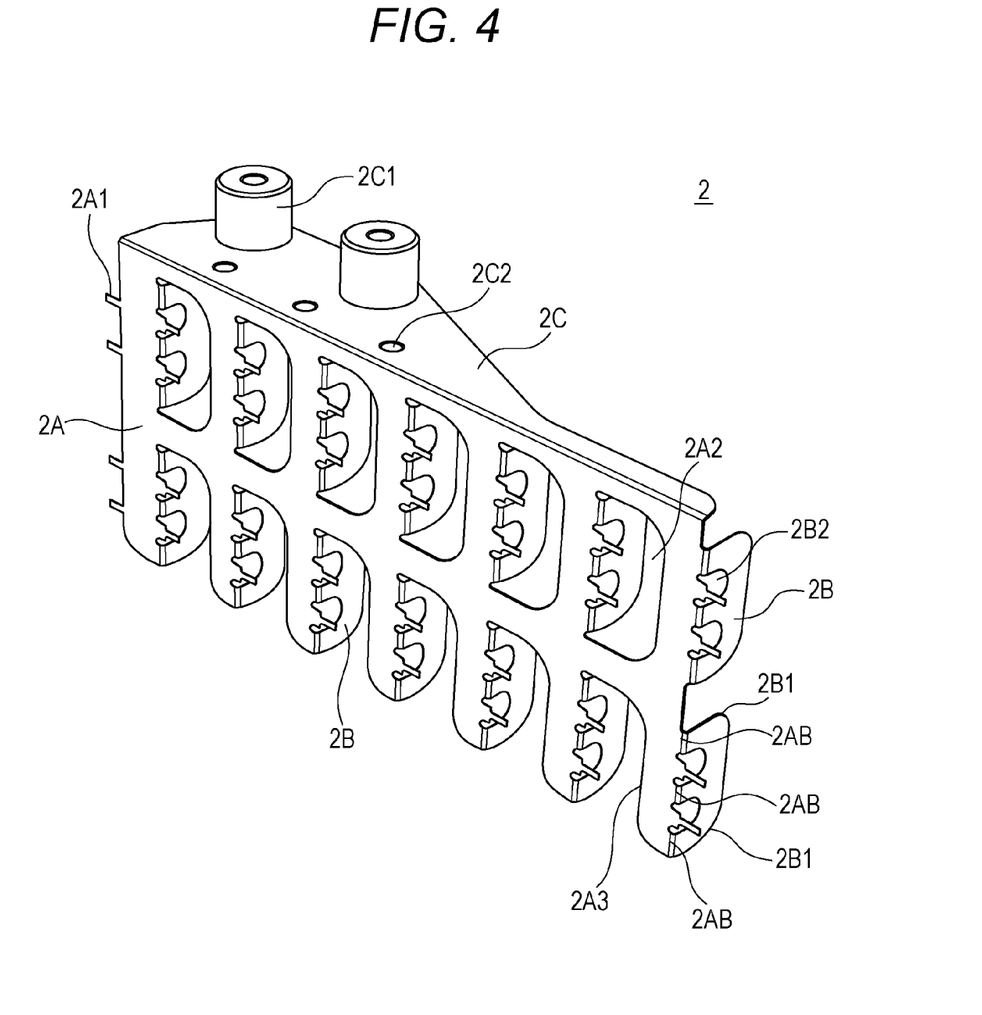
FIG. 4 is a perspective view of a bus bar of the film capacitor according to the exemplary embodiment of the present invention.
Figure 5A:
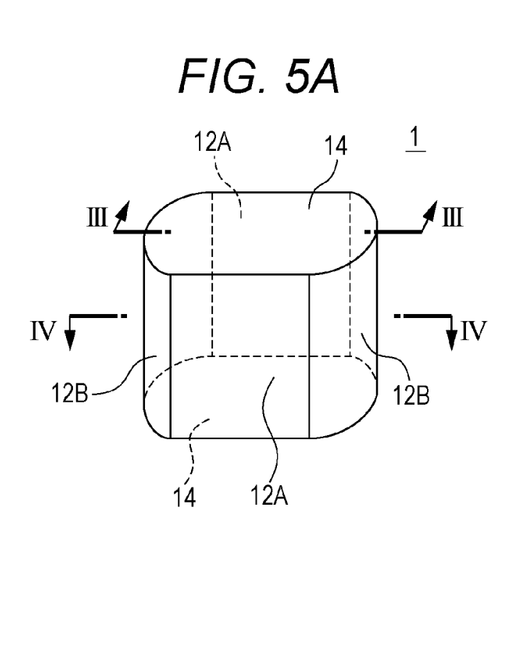
FIG. 5A is a perspective view of a capacitor element of the film capacitor according to the exemplary embodiment of the present invention.
Figure 5B:
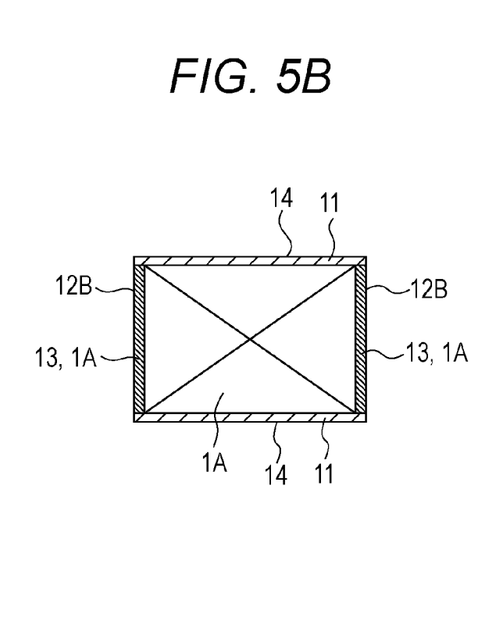
FIG. 5B is a sectional view of a capacitor element of the film capacitor according to the exemplary embodiment of the present invention.
Figure 5C:
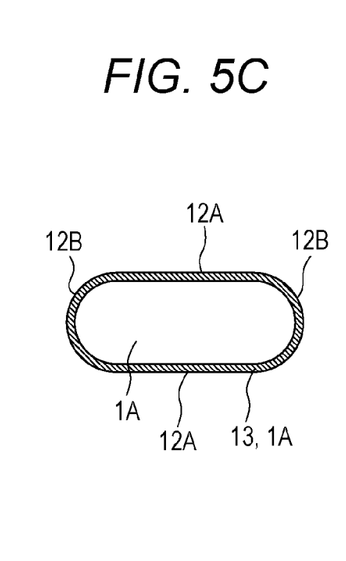
FIG. 5C is a sectional view of a capacitor element of the film capacitor according to the exemplary embodiment of the present invention.

FIG. 1 is a perspective view of capacitor elements 1 that are included in the film capacitor according to the exemplary embodiment and are connected to bus bars 2. FIG. 2 is a sectional view taken along line I-I of FIG. 1, and FIG. 3 is a sectional view taken along line II-II of FIG. 1. FIG. 4 is a perspective view of bus bar 2. FIG. 5A is a perspective view of capacitor element 1, FIG. 5B is a sectional view taken along line of FIG. 5A, and FIG. 5C is a sectional view taken along line IV-IV of FIG. 5A.

The film capacitor of the exemplary embodiment includes two adjacent capacitor elements 1 and bus bars 2 connected to capacitor elements 1. Each of capacitor elements 1 has dielectric films and metal layers that are alternately disposed, metallikon electrodes (end-face electrodes) 11 at its respective two end faces 14, and an insulating film at its lateral surface 12. Capacitor elements 1 are disposed so that respective lateral surfaces 12 of adjacent capacitor elements 1 are mutually opposed. Each of bus bars 2 interconnects respective metallikon electrodes (end-face electrodes) 11 of adjacent capacitor elements 1 on one side. Bus bars 2 each include second part (tongue piece) 2B, and second part (tongue piece) 2B is disposed between lateral surfaces 12 of adjacent capacitor elements 1.

A specific structure will be described as follows. As shown in FIG. 1, the film capacitor of the exemplary embodiment has sixteen capacitor elements 1. Each of capacitor elements 1 is formed with metallikon electrodes 11 at its both ends, respectively. It is to be noted that, in the drawings, the same reference marks are used with no distinction made between a positive electrode and a negative electrode. Here, the structure of capacitor element 1 is described in detail based on its forming method. First, a pair of metallized films, which is formed of the metal layer (evaporated electrode) formed on at least one side of the dielectric film made of, for example, polypropylene (hereinafter referred to as "PP") by aluminum evaporation, is stacked on top of each other and rolled together. Insulating film (PP film) 13 is thereafter wound about ten turns for protection, whereby a winding is formed. Next, the winding is pressed into a flattened shape (having two flat surfaces and two curved surfaces), thus forming molding 1A. Two mutually opposed end faces of molding 1A are sprayed with zinc to be formed with respective metallikon electrodes 11, whereby capacitor element 1 is completed. Thus, capacitor element 1 is constructed such that the evaporated metal layers that face each other across the dielectric film are taken out via respective metallikon electrodes 11.

Capacitor element 1 formed as described above has two mutually opposed end faces 14 and lateral surface 12 as shown in FIG. 5A, and lateral surface 12 has two mutually opposed flat surfaces 12A and two mutually opposed curved surfaces 12B. As shown in FIG. 5B, two end faces 14 of capacitor element 1 are formed with respective metallikon electrodes 11, and lateral surfaces 12 of capacitor element 1, i.e., flat surfaces 12A and curved surfaces 12B, have the insulating films. In the exemplary embodiment, the two end faces formed with respective metallikon electrodes 11 are coupled by the lateral surfaces, that is, the flat surfaces and the curved surfaces. It is to be noted that second part 2B is disposed between flat surfaces 12A of adjacent capacitor elements 1 in the exemplary embodiment.

Bus bars 2 are made of, for example, metal such as copper, and are made up of a positive-electrode bus bar and a negative-electrode bus bar. In the exemplary embodiment, the positive-electrode bus bar and the negative-electrode bus bar are of the same shape, and the bus bar for one of the polarities can be used as the bus bar for the opposite polarity.

As shown in FIG. 4, bus bar 2 is provided by connection of first part 2A, second parts 2B each having the shape like a tongue piece, and third part 2C. First part 2A is disposed to face end face 14 formed with metallikon electrode 11 and includes parts for connection to metallikon electrode 11. Each of second parts 2B is a part bent 90 degrees with respect to first part 2A and is disposed to face lateral surfaces 12 of adjacent capacitor elements 1. Similarly, third part 2C is a part bent 90 degrees with respect to first part 2A.

First part 2A is provided with two metallikon electrode connections 2A1 at each place corresponding to metallikon electrode 11. First part 2A also has six holes 2A2 and six notches 2A3. Holes 2A2 and notches 2A3 are formed as a result of press working carried out for formation of second parts 2B in a bus bar forming process that is described later.

Each of second parts 2B includes chamfers 2B1 at its respective corners and two holes 2B2 resulting from formation of metallikon electrode connections 2A1 of first part 2A. Providing such chamfers 2B1 in the exemplary embodiment can reduce stress applied to the protective PP film and the dielectric films from the corners, thereby inhibiting leak current.

Third part 2C includes two external terminals 2C1 and three holes 2C2 for enabling efficient filling of insulating resin liquid in a sealing process that is described later.

With reference to FIGS. 2 and 3, placement of positive-electrode bus bar 2AP and negative-electrode bus bar 2AN with respect to capacitor elements 1 is described further in detail. It is to be noted that in these drawings, reference marks making a distinction between the positive electrode and the negative electrode are used for explanation. As shown in FIG. 2, positive metallikon electrode connection 2A1P is connected to end face 14P of capacitor element 1 on a positive metallikon electrode side by soldering or resistance welding. Similarly, negative metallikon electrode connection 2A1N is connected to end face 14N of the capacitor element on a negative metallikon electrode side by soldering or resistance welding.

In the exemplary embodiment, bus bars 2 each have second parts 2B, and each of second parts 2B is disposed between lateral surfaces 12 of adjacent capacitor elements 1. In cases where the capacitor elements repeat charging and discharging using high-frequency current or large current, the capacitor elements generate heat, and thus the heat accumulates particularly between the adjacent capacitor elements. However, according to the structure of the exemplary embodiment, the heat generated by capacitor elements 1 is conducted from tongue pieces 2B to first part 2A and third part 3C. In this way, the heat can be dissipated to the outside from the film capacitor, whereby the film capacitor can have increased reliability with improved heat-dissipating performance.

As shown in FIGS. 2 and 3, positive-electrode second part 2BP of the positive-electrode bus bar and negative-electrode second part 2BN of the negative-electrode bus bar are disposed between and abut on lateral surfaces 12 of two adjacent capacitor elements 1 in the exemplary embodiment. As shown in FIG. 3, the positive-electrode second part 2BP starts from the positive-electrode bus bar 2AP, bends at bend 2AB and extends, along a direction from the positive electrode to the negative electrode, toward a middle part of the lateral surface 12. Also, negative-electrode second part 2BN starts from the negative-electrode bus bar 2AN, bends at bend 2AB and extends, along a direction from the negative electrode to the positive electrode, to toward a middle part of the lateral surface 12. Thus, in the exemplary embodiment, the heat generated by the capacitor elements can be dissipated to the outside more efficiently, which increases the reliability of the film capacitor further.

It is preferable that positive-electrode second part 2BP of the positive-electrode bus bar and negative-electrode second part 2BN of the negative-electrode bus bar that are disposed between lateral surfaces 12 of two adjacent capacitor elements 1 have their respective ends disposed near a center of each lateral surface 12 along a direction in which the metallikon electrodes are aligned. This enables further improvement of the heat-dissipating performance.

As shown in FIGS. 1, 5A, 5B, and 5C, capacitor element 1 has a flattened shape when viewed from its end face, and the lateral surface of capacitor element 1 has two mutually opposed curved surfaces 12B and two mutually opposed flat surfaces 12A positioned between two curved surfaces 12B. It is to be noted that curved surface 12B may partly include a flat surface. Between respective flat surfaces 12A of adjacent capacitor elements 1, second part 2B is disposed. According to this structure, second part 2B disposed is in contact with or proximate to flat surfaces 12A, thereby enabling more efficient conduction of the heat generated by capacitor elements 1 to the tongue piece. Moreover, curved surfaces 12B define space among the adjacent capacitor elements, so that the heat can be prevented from diffusing among adjacent capacitor elements 1.

The second part is a thin plate having a thickness of about 0.5 mm to 2 mm, so that the second part has a smaller volume than slit 93A of the conventional technique and thus does not inhibit downsizing of the film capacitor.

In a case where the film capacitor is incorporated in a motor driving inverter circuit (particularly for use in an electric train or a vehicle), the film capacitor performs charging and discharging using large current, thereby generating heat with more ease. By applying the present invention to such a case, the film capacitor having high reliability can be provided.

(Manufacturing Method)

Hereinafter, a description will be given of a method for manufacturing the film capacitor according to the exemplary embodiment.

(Capacitor Element Forming Process)

In a capacitor element forming process, capacitor element 1 as shown in FIG. 5A is prepared. First, the metal layer (evaporated electrode) is formed on one side of the dielectric film that is made of PP by aluminum evaporation, whereby the metallized film is formed. It is to be noted that although aluminum is used as metal for evaporation in the exemplary embodiment, zinc, magnesium, or a mixture of these metals may be used instead.

Next, the positive-electrode metallized film and the negative-electrode metallized film are stacked and rolled together with their respective edges positioned in their width direction slightly offset from each other. The protective PP film is thereafter wound about ten turns, whereby the cylindrical winding is formed. A curved outer peripheral surface of this winding is pressed from both sides in a radial direction of the winding into the flattened shape (like an athletics track), thus forming molding 1A. The two mutually opposed end faces of flattened molding 1A are sprayed with zinc, thus being formed with respective metallikon electrodes 11. Film capacitor element 1 is thus completed with its metal layers, which face each other across the dielectric film, connecting with the respective metallikon electrodes.

(Bus Bar Forming Process)

Figure 6A:
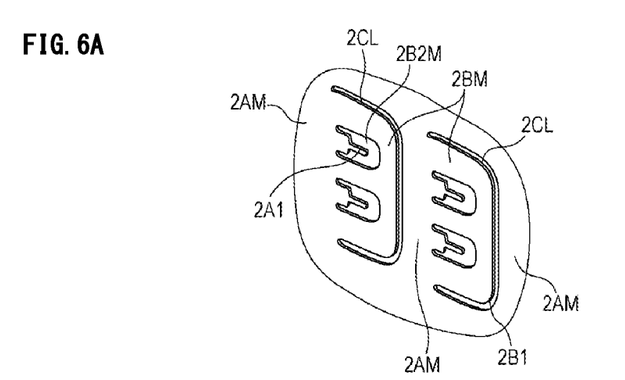
FIG. 6A is a perspective view for describing formation of a second part of the bus bar included in the film capacitor according to the exemplary embodiment of the present invention.
Figure 6B:
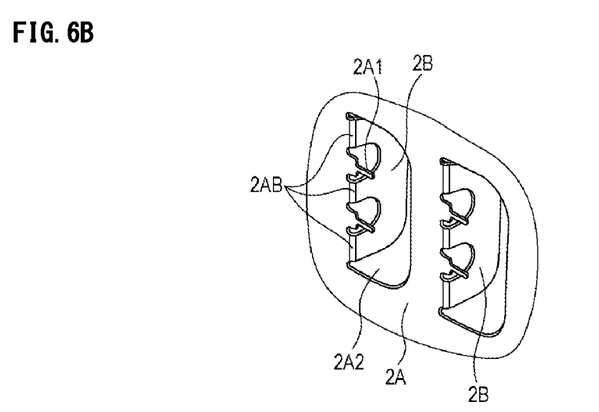
FIG. 6B is a perspective view for describing formation of a second part of the bus bar included in the film capacitor according to the exemplary embodiment of the present invention.

Next, bus bar 2 as shown in FIG. 4 is formed in the bus bar forming process. First, a copper base material that is shaped like a thin plate and has a thickness of, for example, 1 mm is prepared. The base material is subjected to press working, so that first part 2A, second parts 2B and third part 2C are formed to form bus bar 2. Hereinafter, with reference to FIGS. 6A and 6B, the formation of first part 2A and second parts 2B is mainly described. FIG. 6A illustrates a state of second parts 2B that is at a halfway stage of formation of second parts 2B, and FIG. 6B illustrates a state of second parts 2B that are formed. Here, only part of bus bar 2 is illustrated for simplified explanation.

First, the base material undergoes press working to be formed with dividing grooves 2CL as shown in FIG. 6A, whereby first-part region 2AM that becomes first part 2A and second-part regions 2BM that become second parts 2B are formed. The press working is performed in a state that first-part region 2AM is connected to second-part regions 2BM, and each of second-part regions 2BM is formed with chamfers 2B1 that become respective corners of second part 2B. At the same time, each of second-part regions 2BM is also formed with holes 2B2M, whereby metallikon electrode connections 2A1 are formed as parts of first-part region 2AM.

Next, each of second-part regions 2BM is bent (undergoes bending working) along a position corresponding to bend 2AB so as to be substantially perpendicular to first-part region 2AM, whereby first part 2A and second parts 2B are formed. Holes and notches that result from this bending become holes 2A2 and notches 2A3 of first part 2A. It is to be noted that in FIG. 6B, only holes 2A2 are shown.

According to a conventional method, parts corresponding to second parts 2B (parts to be bored) are bored by press working to be completely separated from a bus bar, and the bored parts are discarded as being of no use. In the exemplary embodiment, the bored parts originally discarded as being unneeded are effectively utilized as members for dissipating heat, so that the improved heat-dissipating performance can be achieved at a low cost.

In addition, first part 2A and each of second parts 2B are members that are not separate, but are integrated with each other in the exemplary embodiment, so that a mechanism for mounting second parts 2B to first part 2A is not required. Consequently, further cost reduction and downsizing can be achieved.

(Connection Process)

In a connection process, capacitor elements 1 are connected to bus bars 2. As described above, each of bus bars 2 can be used for either the positive electrode or the negative electrode. Capacitor element 1 and bus bar 2 are disposed so that metallikon electrode connections 2A1 of bus bar 2 are disposed in a predetermined position of metallikon electrode 11 of capacitor element 1, and metallikon electrode 11 is connected to metallikon electrode connections 2A1 by resistance welding or soldering.

As shown in FIGS. 2 and 3, positive-electrode second part 2BP and negative-electrode second part 2BN are spaced a predetermined distance away from each other in a clearance between lateral surfaces 12 of adjacent capacitor elements 1 and abut on lateral surfaces 12 of capacitor elements 1. Second part (tongue piece) 2B of one of the polarities extends from bend 2AB toward the opposite metallikon electrode between lateral surfaces 12 of adjacent capacitor elements 1, so that the heat accumulating in the clearance between the lateral surfaces of adjacent capacitor elements 1 can efficiently be dissipated to the outside from the film capacitor. Thus, the film capacitor can have the increased reliability.

(Sealing Process)

In a sealing process, capacitor elements 1 are sealed in for completion of the film capacitor. First, an upwardly opening case (not shown) that is made of resin and has a concavity is prepared. Next, capacitor elements 1 connected with bus bars 2 are seated in the concavity of the case. It is to be noted that external terminals 2C1 of bus bars 2 project outwardly from the concavity of the case. Next, the high-temperature insulating resin liquid is poured from an opening of the concavity of the case. Third part 2C is formed with three holes 2C2, so that the insulating resin liquid can be filled efficiently into space defined by lateral surfaces 12 of capacitor elements 1 and respective surfaces of bus bars 2. The insulating resin liquid is cooled thereafter to form an insulating resin layer. Thus, the film capacitor of the exemplary embodiment is completed.

In the bus bar used in the exemplary embodiment, each of second parts (tongue pieces) 2B that is positioned between lateral surfaces 12 of adjacent capacitor elements 1 connects at bend 2AB. However, the present invention is not limited to this bus bar. A bus bar may have, for example, tongue pieces in the form of separate members that correspond to the respective second parts in shape, and these separate members may each be joined to a part corresponding to the bend of the bus bar by welding. However, as described above, such a bus bar requires the preparation of the separate members and the welding process. For this reason, it is preferable that the second parts (tongue pieces) structurally connect with the first part at respective bends 2AB, that is to say, the bus bar is partly bent to form the tongue pieces, whereby cost reduction and simplified processes can be enabled.

INDUSTRIAL APPLICABILITY

A film capacitor with improved heat-dissipating performance can be provided.

The invention claimed is:

1. A film capacitor comprising:
two adjacent capacitor elements, each of the adjacent capacitor elements having end-face electrodes at two end faces, respectively, and an insulating film at a lateral surface, each of the adjacent capacitor elements having dielectric films and metal layers that are alternately disposed; and
a bus bar for connecting the end-face electrodes of the adjacent capacitor elements on one side, wherein
the lateral surfaces of the adjacent capacitor elements are disposed to be opposite to each other,
the bus bar includes a tongue piece,
the tongue piece is disposed between the lateral surfaces of the adjacent capacitor elements,
the tongue piece extends along the lateral surfaces of the adjacent capacitor elements from one of the end-face electrodes in a direction toward another one of the end-face electrodes,
one of the two end faces is formed with a positive metallikon electrode, while another of the two end faces is formed with a negative metallikon electrode,
the positive metallikon electrode is connected to a positive-electrode bus bar, while the negative metallikon electrode is connected to a negative-electrode bus bar, and
the tongue piece of the positive-electrode bus bar and the tongue piece of the negative-electrode bus bar are disposed between the lateral surfaces of the adjacent capacitor elements.

2. The film capacitor according to claim 1, wherein the tongue piece is a bent part where the bus bar is partially bent.

3. The film capacitor according to claim 1, wherein
the lateral surface of each of the adjacent capacitor elements includes two mutually opposed curved surfaces and two mutually opposed flat surfaces positioned between the two curved surfaces, and
the tongue piece is disposed between the flat surfaces of the adjacent capacitor elements.

4. The film capacitor according to claim 1, wherein the tongue piece is chamfered.

* * * * *